(12) United States Patent
Vanjani et al.

(10) Patent No.: US 6,463,137 B1
(45) Date of Patent: Oct. 8, 2002

(54) TOLL-FREE TELEPHONIC COMMUNICATION METHOD AND DEVICE

(75) Inventors: Govind W. Vanjani, Danbury, CT (US); David Wilkie, Marietta, GA (US)

(73) Assignee: Geo-Group Communications, Inc., Atlanta, GA (US)

(*) Notice: Subject to any disclaimer, the term of this patent is extended or adjusted under 35 U.S.C. 154(b) by 0 days.

(21) Appl. No.: 09/316,042

(22) Filed: May 21, 1999

(51) Int. Cl.[7] ............................................... H04M 15/00
(52) U.S. Cl. ............................... 379/114.26; 379/127.03
(58) Field of Search ........................... 379/88.2, 114.01, 379/114.15, 114.26, 127.01, 127.03, 127.06, 144.01, 144.24

(56) References Cited

U.S. PATENT DOCUMENTS 5,199,062 A * 3/1993 Von Meister et al. ... 379/196 X
5,604,791 A * 2/1997 Lee .............................. 379/142
5,828,742 A * 10/1998 Khalid et al. ........... 379/188 X

* cited by examiner

Primary Examiner—Creighton Smith
(74) Attorney, Agent, or Firm—Piper Rudnick LLP; Jerold I. Schneider

(57) ABSTRACT

The present invention is a method and device for toll-free telephonic communications. According to a method of the present invention, a caller dials a toll-free number to establish a connection with a telecommunications platform. The caller then enters an authorization code that the telecommunications platform validates. If the authorization code is valid, the telecommunications platform can connect the caller to a called party or record a message by the caller for later retrieval by the called party.

43 Claims, 2 Drawing Sheets

TOLL-FREE TELEPHONIC COMMUNICATION METHOD AND DEVICE

TECHNICAL FIELD

The invention relates to telephonic communications. More particularly, the invention relates to a method and device for toll-free telephonic communications.

BACKGROUND ART

Toll-free long distance telephonic communications is presently expensive and awkward. Traditionally, toll-free telephone calls required the assistance of a human operator to seek authorization by the called party to accept the call and its accompanying charges. More recently, toll-free callers have been required to dial special prefixes to access less costly toll-free long distance services. Calling cards, whether prepaid to a fixed amount or subject to periodic billing, although not directly providing toll-free calling, can be used to shift the cost of long distance calls from a caller to an intended recipient of calls when the intended recipient of calls gives a calling card to the caller. However, a disadvantage of using a calling card gift as a cost shifting mechanism is that the intended recipient of calls (i.e., the giver) loses control of the gift, because the caller (i.e., the gift recipient) is free to call others using the calling card.

SUMMARY OF THE INVENTION

According to a method of the present invention, a caller dials a telephone number, which is preferably a toll-free number, to establish a connection with a telecommunications platform. The caller then enters a authorization code that the telecommunications platform validates. If the authorization code is valid, the telecommunications platform can connect the caller to a called party or record a message by the caller for later retrieval by the called party.

As contrasted with conventional toll-free calling, the present invention offers a toll-free telephonic communications service that has the potential to be more economical, may provide enhanced services, and better accomplishes cost shifting.

BRIEF DESCRIPTION OF DRAWINGS

The foregoing advantages of the present invention, together with other benefits which may be attained by its use, will become more apparent upon reading the following detailed description of a preferred embodiment of the presnet invention taken in conjunction with the following drawings.

DETAILED DESCRIPTION OF A PREFERRED EMBODIMENT

Figure 1:
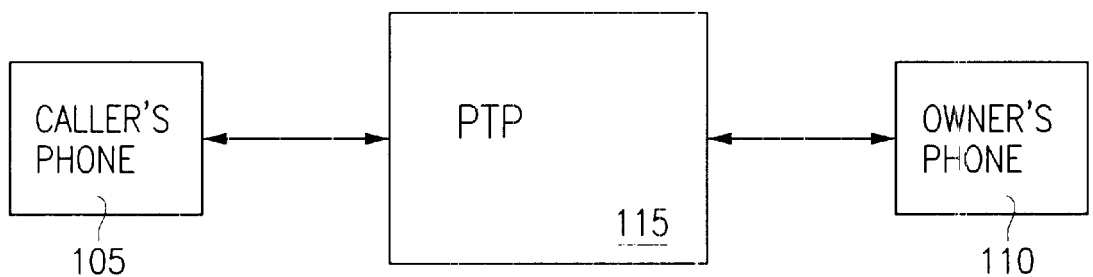
FIG. 1 is a diagram of an end-to-end call connection according to the present invention.

FIG. 1 is a diagram illustrating an end-to-end connection of a toll-free call according to the present invention. A caller's phone 105 and a phone 110 of a called party or "owner," who is a call or message recipient, are connected via a telecommunications platform, such as a proprietary telecommunications platform (PTP) 115. Any telecommunications platform, such as a private branch exchange (PBX), switching center or local exchange office, may perform the same functions as the PTP 115, but a separate, proprietary platform is preferred. FIG. 1 illustrates the most direct route between the caller's phone 105 and the owner's phone 10, in that only a single PTP is present between the caller's phone 105 and the owner's phone 110. However, in the more general case, the single PTP maybe a network of interconnected PTPs. In such a case, a connection between the caller's phone 105 and the owner's phone 110 is established or routed according to well known techniques of circuit switching, packet switching or some combination.

Although, the caller's phone 105 is referred to as a "phone" for ease of explanation, one skilled in the art would readily appreciate that the caller's phone 105 could be any telephonic device, such as, for example, a modem, facsimile, or PBX. Likewise, although the owner's phone 110 is referred to as "phone," one skilled in the art would readily appreciate that the owner's phone 105 could be any communication device.

Figure 2:
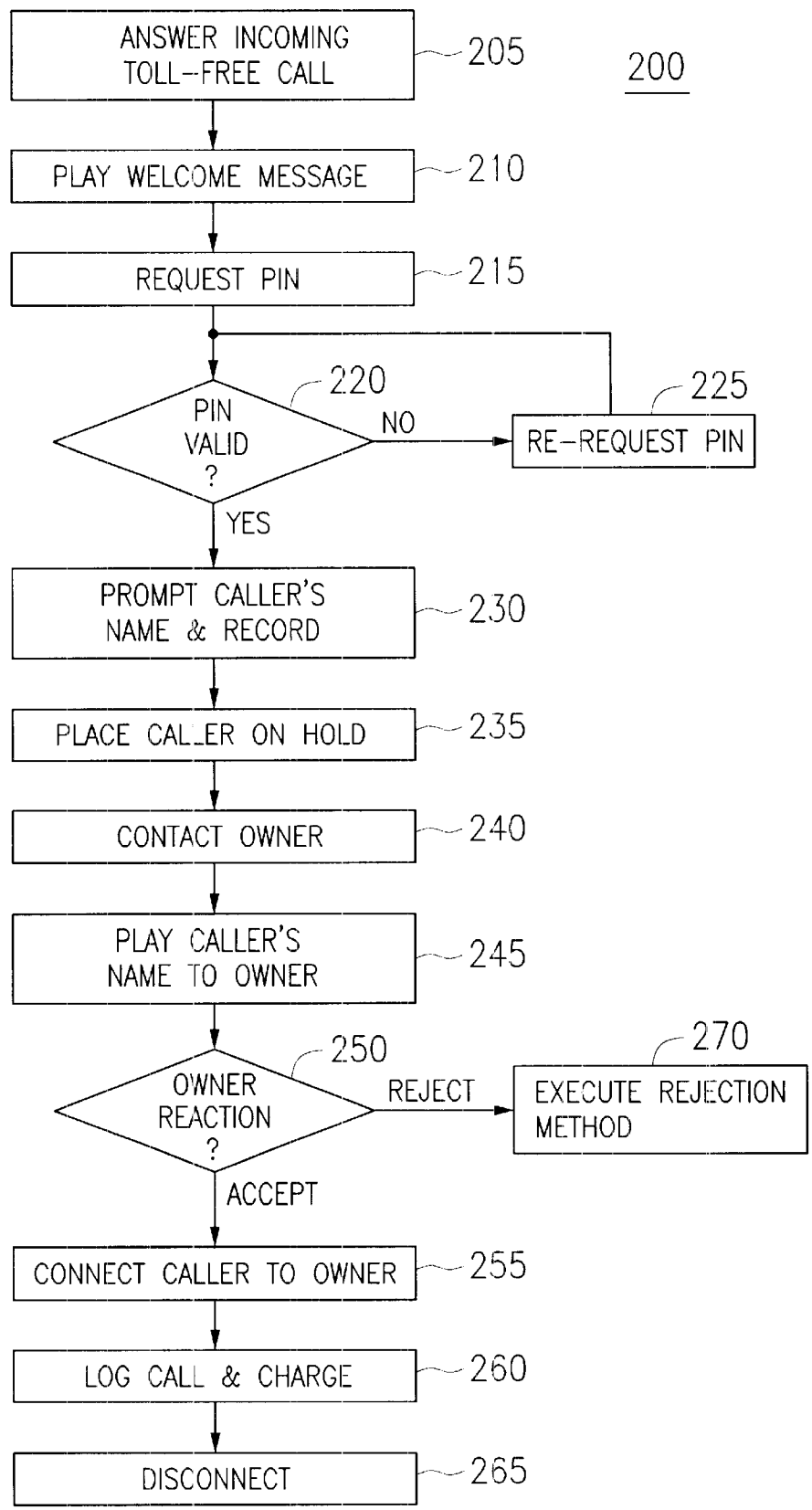
FIG. 2 is a flowchart of a method according to the present invention.

FIG. 2 is a flow chart of a method 200 according to the present invention. The method 200 is implemented by the PTP 115. According to the method 200, an answering step 205 is first executed, whereby the PTP 115 receives and answers an incoming toll-free call from the caller's phone 105. After receipt of the toll-free call, a welcoming step 210 is performed, whereby an introductory message, preferably short in duration, is played for the caller. The brief welcome message may, for example, identify the proprietor or service provider of the method 200. Next, a requesting step 215 requests that the caller enter an authorization code. The authorization code, which is also referred to as a personal identification number (PIN), may be any sequence of telephone keypad characters. In a preferred embodiment, the authorization code is equivalent to the phone number of the owner's phone 110, for convenient reference or memorization. After receiving an authorization code entered by the caller, a validation step 220 is performed. The validation step 220 checks whether the entered authorization code is valid, e.g., by searching within a list of valid authorization codes or detecting a unique checksum or syndrome of the code. If the authorization code entered by the caller is not valid, then a re-requesting step 225 is executed, whereby the caller is prompted again to enter the authorization code. If the authorization code is found to be valid, then a prompting step 230 prompts the caller to sound the caller's name or identification so that it may be recorded. Next, a holding step 235 places the caller on hold while a contacting step 240 contacts the owner's phone 110. After successfully calling the owner, the method 200 preferably performs a name playing step 245, whereby the caller's recorded name or identification is played to the owner. At this point, the owner may decide to accept or reject the call from the caller. A reacting step 250 assesses the owner's directive as to whether to accept or reject the call. If the owner elects to accept the call, then a connecting step 255 connects the toll-free call from the caller to the owner, thus establishing an end-to-end connection. A logging and charging step 260 logs one or both legs of the call, records the duration of the call and charges the call to the owner or other party responsible for payment. The method of charging may be billing by invoice or debiting from a pre-paid account. Upon completion of the call, a disconnecting step 265 disconnects both legs of the end-to-end call.

If the owner elects to reject the call from the caller, then a rejecting step 270 is performed. According to the rejecting step 270, one or more of several courses of action may be taken. A first rejection option is to inform the caller that the owner is not available. A second rejection option is to record a message by the caller for later retrieval by the owner. The method 200 may first prompt the caller to determine whether the caller wishes to leave a message in this case.

An alternative to the method 200 is a dedicated messaging method. In this alternative, the prompting step 230, the holding step 235, the contacting step 240, the name playing step 245, the reacting step 250, the connecting step 255, and the rejecting step 270 are replaced by a single messaging step. According to this messaging step, the caller simply records a message which is delivered to the owner (e.g., by email with a sound file attachment) or stored by the PTP 115 for later retrieval by the owner.

Dissemination of an authorization code by the owner to a caller may be accomplished in a variety of manners. In one form, the owner may simply, in any manner, inform the caller of the authorization code and toll-free phone number used to access the PTP 115. In another form, the owner may give to the caller a calling card, such as a credit card style calling card, on which is printed or magnetically encoded the authorization code and/or toll-free phone number to one or more PTPs. Such a calling card may be prepaid to a certain amount or may be subject to periodic billing by invoice. In yet another form, the owner may provide to the caller a dedicated telephone such as a cellular or wireless telephone. Such a dedicated telephone is preprogramed only with the capability to call one or more PTPs (i.e., a single call button rather than a numeric key pad for dialing). Thus, the caller with such a dedicated telephone may only call the owner. Such a dedicated telephone may be constructed or programmed so as to automatically provide the correct authorization code upon connection to the PTP 115.

In another alternative embodiment, the requesting step 215, the validating step 220, the re-requesting step 225, and perhaps the prompting step 230 are replaced by a caller authorization step using caller ID or ANI (automatic number identification) technology. According to this alternative, the owner or other responsible party registers one or more caller telephone numbers with the PTP 115. The PTP maintains a database of registered caller numbers. Each registered number in the database is associated with an owner. When the PTP 115 receives a tollfree call, caller ID or ANI circuitry determines the calling or originating number of the caller's phone 105. If the calling number matches an entry in the database of registered caller numbers, then the holding step 235 and contacting step 240 are executed. The contacting step 240 automatically contacts the registered owner on the basis of stored contact information (e.g., the phone number of the owner's phone 110). In this case, the prompting step 230 is optional because the caller's name/identification may be pre-recorded and stored as part of the entry for that registered caller's number in the database. The exploitation of caller ID or ANI information, as well as other aspects of this alternative embodiment, are described in greater detail in patent application Ser. No. 09/392,474, entitled "Telephone Switching System," which is hereby incorporated by reference.

An inherent limitation of the alternative embodiment just described is that a given caller's phone 105 is capable of calling only one party (namely the owner's phone 110 to which the caller's number is linked in the database of registered caller numbers). To overcome this limitation, an overriding step and/or a selection step may be taken. According to an overriding step, the PTP 115 pauses briefly before automatically contacting the registered owner. During this brief pause, the calling party may begin entering an authorization code or press a key that signifies to the PTP 115 that an authorization code is about to be entered. Then, the validating step 220, re-requesting step 225 (if necessary), and subsequent steps of the method 200 are executed, in which case the call is to the "owner" of the PIN/ authorization code, rather than the registered "owner" of calls from the caller's phone 105. In a similar manner, a selecting step provides flexibility to the caller. When a selecting step is provided, a caller who is registered for "automatic" contact to multiple owners, is presented, after caller authorization on the basis of caller ID or ANI, with the opportunity to select which registered owner to contact. After selection, the communication proceeds according to the method 200 beginning at the prompting step 230 or the holding step 235.

Figure 3:
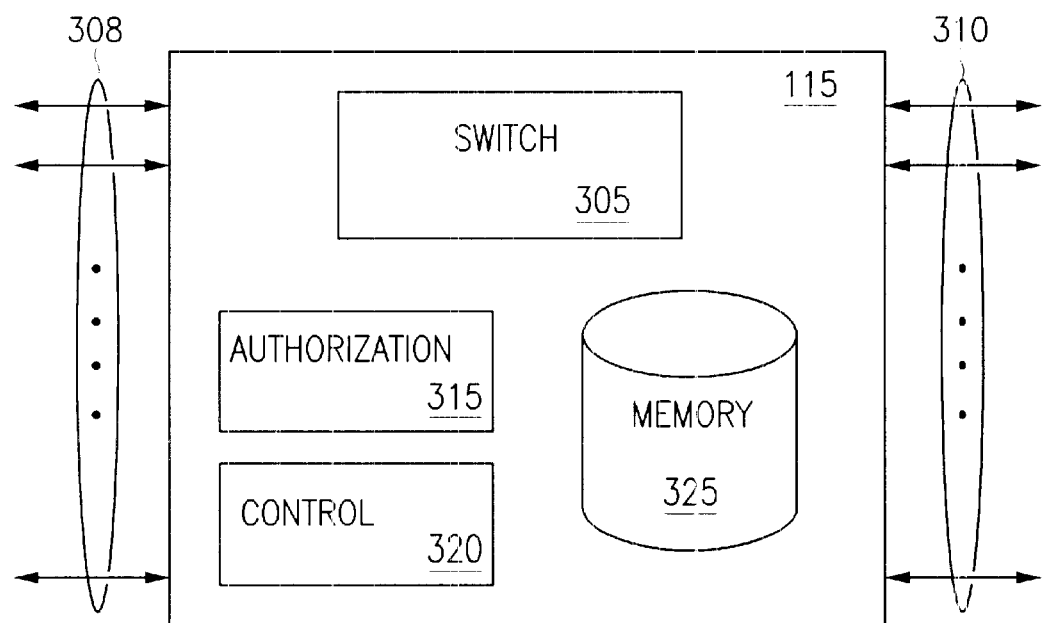
FIG. 3 is a block diagram of a proprietary telecommunications platform (PTP).

FIG. 3 is an internal block diagram of the PTP 115. The PTP 115 comprises a switch 305 that is used to connect telephone connections 308 (preferably toll-free) to owner connections 310. The owner connections could interface to any communication channel, such as, for example, telephonic channels, the Internet, or private connections wired or wireless. An authorization module 315 functions to validate authorization codes. A control module 320, which may or may not be part of the authorization module 315, operates to control the operation of the authorization module 315, the switch 305 and other components of the PTP 115. A memory 325 is utilized to store messages including welcome messages, recorded messages for owners, callers name/ identification, etc. The memory 325 is also used to hold instructions and data to control the operation of the PTP 115. Finally, the memory 325 is used to hold a database of valid authorization codes and/or registered originating phone numbers of callers as well as a database of logged calls and charges associated with such calls. When the PTP 115 performs message storage, an owner retrieves messages via the owner connections 310 preferably, although retrieval via the telephone connections 308 is also possible.

The terms and descriptions used herein are set forth by way of illustration only and are not meant as limitations. In particular, although a method of the present invention has been described with reference to FIG. 2, the steps of the method may be performed in a different order than illustrated or steps may be performed simultaneously. Furthermore, although a device of the present invention has been described with reference to specific hardware in FIG. 3, the elements of present inventive device may be implemented as hardware, firmware, software or some combination. Those skilled in the art will recognize that these and other variations are possible within the spirit and scope of the invention as defined in the following claims and their equivalents.

What is claimed is:

1. A method comprising:

receiving a telephone call from a caller;

receiving from a caller an authorization code that corresponds to a called party;

validating the received authorization code;

contacting the called party, if the authorization code is valid; and receiving a directive from the called party as to whether to allow the caller to make verbal connection to the called party or not.

2. The method of claim 1 wherein the telephone call is a toll-free call.

3. The method of claim 2 wherein the toll-free call is a long distance call.

4. The method of claim 1 further comprising:
playing a welcome message in response to receiving the toll-free call.
5. The method of claim 1 further comprising:
requesting the authorization code from the caller.
6. The method of claim 5 further comprising:
re-requesting the authorization code from the caller, if the received authorization code is invalid.
7. The method of claim 1 further comprising:
prompting the caller to sound an identification, if the received authorization code is valid; and
recording the identification.
8. The method of claim 7 further comprising:
playing the identification to the called party.
9. The method of claim 1 further comprising:
placing the caller on hold before contacting the called party.
10. The method of claim 1 wherein the authorization code is a PIN.
11. The method of claim 1 wherein the authorization code is the telephone number of the called party.
12. The method of claim 11 wherein the connection is a telephonic connection.
13. The method of claim 1 further comprising:
informing the caller that the called party is unavailable.
14. The method of claim 1 further comprising:
recording a message by the caller for the called party.
15. The method of claim 1 further comprising:
logging the telephone call and/or the contacting step.
16. The method of claim 1 further comprising:
charging a responsible party.
17. The method of claim 16 wherein the responsible party is the called party.
18. A method comprising:
receiving a telephone call from a caller;
receiving from the caller an authorization code that corresponds to a called party;
validating the received authorization code;
recording a message by the caller for the called party; and
receiving a directive from the called party as to whether to allow the recorded message to be transmitted to the called party or not.
19. A method comprising:
receiving a telephone call from a caller at an originating phone number;
determining the originating phone number;
validating the originating phone number;
contacting a called party determined by the originating phone number, if the originating phone number is valid;
receiving a directive from the called party as to whether to allow the caller to speak with the call party.
20. The method of claim 19 further comprising:
pausing for a time before the contacting step, such that the caller can initiate entry of an authorization code during the time;
receiving the authorization code from the caller;
validating the received authorization code; and
contacting a called party on the basis of the authorization code, if the authorization code is valid.
21. The method of claim 19 further comprising:
receiving a selection from the caller, wherein the called party corresponds to the selection.

22. A method comprising:
receiving a telephone call from a caller at an originating phone number;
determining the originating phone number;
validating the originating phone number;
recording a message by the caller for the called party determined by the originating phone number, if the originating phone number is valid; and
receiving a directive from the called party as to whether to provide the recorded message to the called party or not.
23. A telecommunications platform comprising:
a telephone connection;
a connection to a call recipient;
a switch capable of connecting the telephone connection and the connection to the call recipient; and
an authorization module linked to the telephone connection and the switch, whereby the authorization module selectively controls the switch to connect the telephone connection and the connection to the call recipient;
said authorization module precluding the connection of the telephone connection and the connection to the call recipient in the absence of a directive from the call recipient.
24. The telecommunications platform of claim 23 wherein the authorization module comprises caller ID circuitry.
25. The telecommunications platform of claim 23 wherein the authorization module comprises ANI circuitry.
26. The telecommunications platform of claim 23 further comprising:
a memory.
27. A telecommunications system comprising:
a telephony device;
a communication device; and
a telecommunications platform comprising:
   a telephone confection to the telephony device;
   a connection to the communication device;
   a switch capable of connecting the telephony device and the communication device; and
   an authorization module linked to the connection, to the telephony device and the switch, whereby the authorization module selectively controls the switch to connect the telephony device and the communication device in response to an instruction from the communication device as to whether to establish a connection or not.
28. The telecommunications system of claim 27 further comprising:
a calling card, whereby the calling card is used to link the telephony device to the telecommunications platform.
29. The telecommunications system of claim 27 further comprising:
a calling card, whereby the calling card contains authorization information.
30. The telecommunications system of claim 27 wherein the calling phone is a dedicated phone.
31. The method of claim 1 further including identification of the caller is provided by ANI.
32. The method of claim 1 further including identification of the caller is provided by caller ID.
33. The method of claim 18 wherein the authorization code is selected from the group consisting of a PIN and the telephone number of the called party.
34. The method of claim 18 further including identification of the caller is provided by ANI.

35. The method of claim 18 further including identification of the caller is provided by caller ID.

36. The method of claim 19 wherein the originating phone number is determined by ANI.

37. The method of claim 19 wherein the originating phone number is determined by caller ID.

38. The method of claim 22 wherein the originating phone number is determined by ANI.

39. The method of claim 22 wherein the originating phone number is determined by caller ID.

40. The platform of claim 23 wherein the authorization module receives the directive based upon a PIN.

41. The platform of claim 23 wherein the authorization module receives the directive based upon the telephone number of the called party.

42. The system of claim 27 wherein the instruction from the communication device is based upon at least one of (a) a PIN and (b) the telephone number of the called party.

43. The system of claim 27, wherein the authorization module includes circuitry selected from the group consisting of ANI circuitry and caller ID circuitry.

* * * * *